United States Patent [19]

Luebbert

[11] Patent Number: 5,131,793
[45] Date of Patent: Jul. 21, 1992

[54] FEED MECHANISM

[75] Inventor: William K. Luebbert, Florissant, Mo.

[73] Assignee: McDonnell Douglas Corporation, St. Louis, Mo.

[21] Appl. No.: 736,605

[22] Filed: Jul. 26, 1991

[51] Int. Cl.$^5$ ............................................. B23B 45/14
[52] U.S. Cl. .................... 408/101; 408/102; 408/111; 408/712
[58] Field of Search ............... 408/101, 111, 102, 97, 408/110, 113, 712, 137

[56] References Cited

U.S. PATENT DOCUMENTS

| | | | |
|---|---|---|---|
| 1,584,071 | 5/1926 | Arnold | 408/101 |
| 1,813,785 | 7/1931 | Weber | 408/712 |
| 2,463,266 | 3/1949 | Habenicht | 408/111 |
| 2,463,691 | 3/1949 | Habenicht | 408/712 |
| 3,884,592 | 5/1975 | Shulters | 408/111 |
| 4,011,024 | 3/1977 | Nakano et al. | 408/111 |
| 4,668,134 | 5/1987 | Vindez | 408/130 |

FOREIGN PATENT DOCUMENTS 2413625  10/1975  Fed. Rep. of Germany ...... 408/111

*Primary Examiner*—Daniel W. Howell
*Attorney, Agent, or Firm*—Timothy H. Courson; Guy R. Gosnell; Benjamin Hudson, Jr.

[57] ABSTRACT

A feed mechanism, for use with a right angle drill, capable of feeding a drill bit into a workpiece at variable thrust and position. The feed mechanism, attached to the cutting end of the drill, utilizes the mechanical advantage of a threaded member to feed the drill bit into and out of the workpiece. The entire drill and feed mechanism is held stationary during operation by a holding means which is fixedly attached to the workpiece and in which the feed mechanism is locked.

14 Claims, 1 Drawing Sheet

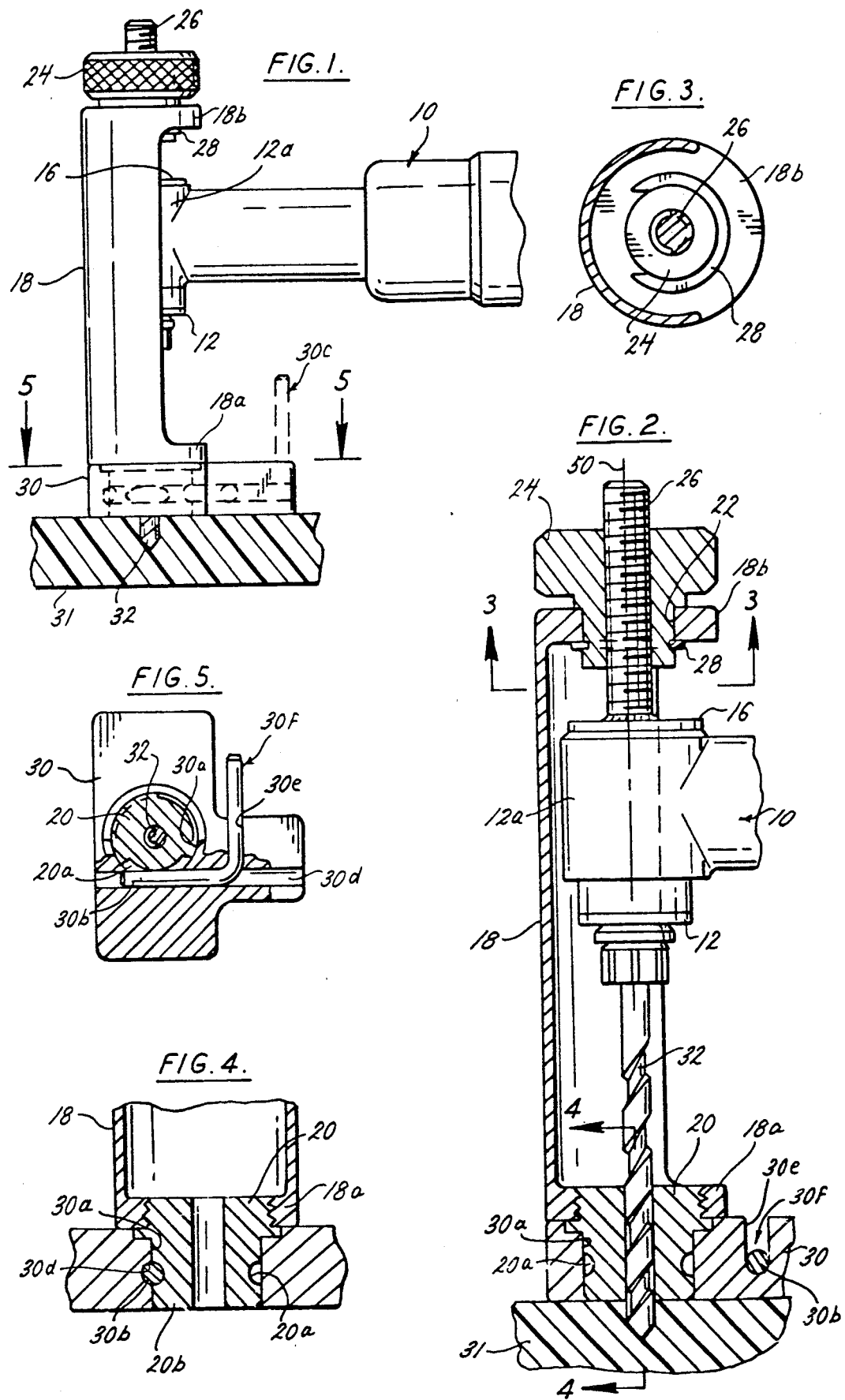

FEED MECHANISM

BACKGROUND OF THE INVENTION

The present invention generally relates to a feed mechanism for sue with a right angle drill. More particularly, it is concerned with obtaining optimum thrust and position of a right angle drill during production manufacturing, primarily in confined part access areas.

In modern drilling processes, it is desirable to eliminate the difficulties that often arise when drilling holes in areas of limited access. Although the right angle drill can remedy this problem to an extent, its use alone still requires additional adjustments in position nd leverage by the operator to achieve the required thrust and hole location for correctly feeding the drill bit into the workpiece.

Previously, right angle drilling thrust requirements in limited access areas were met by using a wood pry bar or similar object. Such devices increase the capability of the operator to exert the required thrust to feed the drill bit into the workpiece during operation. Furthermore, use of these devices generally elevates safety risks, increases production time, decreases part consistency, and contributes to premature bit breakage. Drill bit breakage can be particularly severe when using carbide bits for drilling composite structures: inadvertently side loading the right angle drill while drilling with a leverage device can cause immediate breakage of the carbide drill bit.

Power feed right angle drill equipment, such as that offered by Dresser Industries and others, has been developed to overcome limited access drill feed thrust problems. However, this equipment occupies more work space, requires large drill plates, and requires a locking mechanism, such as locking screws, for locking the drill into the workpiece which may restrict the drill unit's rotational location possibilities.

SUMMARY OF THE INVENTION

The feed mechanism of the present invention includes a housing which partially encloses the cutting end and the gear housing end of a right angle drill. The feed mechanism further includes a holding means, connected to the workpiece and to a first end of the housing, for holding the housing in a fixed position during drilling operation. In the preferred embodiment, the holding means is a drill plate which is clamped to the workpiece with a "C" clamp. Furthermore, the preferred embodiment includes a drill guide bushing, having a groove about its circumference, integrally attached to a first end of the housing.

An adjusting means, adjacent to the gear housing end of the right angle drill, is operably connected to the housing for varying the thrust of the drill bit into the workpiece. In the preferred embodiment, the adjusting means includes both a threaded member adhesively attached to the gear housing end of the right angle drill and knurled screw support for receiving the threaded member. The thrust of the drill bit can be varied by increasing or lessening the torque applied to the knurled screw support of the preferred embodiment; turning the knurled screw support engages the threaded member and drives it axially, feeding and retracting the drill bit by means of the threaded member. The mechanical advantage provided by the threaded member allows low torque on the knurled screw support to be converted to high axial thrust on the drill assembly.

The design of the present invention therefore provides controllable thrust and improved positioning accuracy of a right angle drill in small working environments. As a result, the feed mechanism herein described improves part quality, reduces drill bit breakage, increases safety for the operator, reduces operator fatigue, and allows the operator to utilize time more efficiently, thereby increasing both productivity and consistency for production parts.

BRIEF DESCRIPTION OF THE DRAWINGS

FIG. 1 is a perspective view of the feed mechanism of the present invention incorporated on a right angle drill;

FIG. 2 is a sectional view of the feed mechanism in FIG. 1 for more fully illustrated the novelty of the present invention;

FIG. 3 is a sectional view of the feed mechanism taken along line 3—3 of FIG. 2;

FIG. 4 is a sectional view of the feed mechanism taken along line 4—4 of FIG. 2; and FIG. 5 is a sectional view of the feed mechanism taken along line 5—5 of FIG. 1.

DETAILED DESCRIPTION OF THE PREFERRED EMBODIMENTS

A preferred embodiment of the present invention is shown in FIGS. 1-5 incorporated on a right angle drill 10, at a cutting end 12 and a gear housing end 12a. Referring to FIG. 2, cutting end 12, and gear housing end 12a are partially enclosed by a support housing 18 having a first end 18a and a second end 18b. Support housing 18 includes a drill guide bushing 20 at end 18a, and an aperture 22 at end 18b for receiving a knurled screw support 24.

Support housing 18 partially encloses a threaded member 26 which is adhesively attached to gear housing end 12a with a welded flange 16 which is fixedly attached to threaded member 26. In an alternative embodiment, threaded member 26 can be mechanically attached to gear housing end 12a. Threaded member 26 runs substantially along an axis 50, extends through a snap ring 28 and through aperture 22 in end 18b of support housing 18, where it is threaded through knurled screw support 24. Note that right angle drill 10 is supported within support housing 18 by threaded member 26 at end 12a and by a drill bit 32 within guide bushing 20 at cutting end 12. Knurled screw support 24 is slip-fitted into support housing 18 and is retained by snap ring 28.

Referring to FIG. 1, a drill plate 30 is configured so that it may be fixedly attached such as with a "C" clamp (not shown), to workpiece 31. In an alternative embodiment, drill plate 30 can be vacuum clamped to workpiece 31. Drill guide bushing 20, which provides the path in which drill bit 32 travels, is received by a drill plate hole 30a and locked in position using a pin 30b, as shown in FIG. 2.

Operation of the preferred embodiment is carried out in the following manner: Drill plate 30 is fixedly held to the workpiece with a "C" clamp, vacuum clamp, or other suitable means. Drill guide bushing 20 is locked into drill plate 30 by means of pin 30b. As shown in FIG. 4, drill guide bushing 20 includes a groove 20a about its circumference, located a short distance from an end 20b; Groove 20a complements the contour of drill plate hole 30a providing a means for a secure fit when drill guide bushing 20 and drill plate hole 30a are joined.

Referring to FIG. 5, after drill guide bushing 20 extends through drill plate hole 30a, it is locked in position by engaging pin 30b. upon engagement, pin 30b travels from a first position 30c translationally through groove 30d, rotated substantially ninety degrees, and locked into groove 30e in a secured second position 30f. Following the attachment of the complete assembly to drill plate 30, knurled screw support 24 can be turned clockwise to move right angle drill 10 axially toward workpiece 31 by means of threaded member 26 to gain optimum drilling thrust and position at the required location.

The arrangement and connection between pin 30b, groove 30d, and groove 20a allows housing 18 and right angle drill 10 to be rotated a full 360 degrees while attached to drill plate 30 for optimal positioning of right angle drill 10 prior to operation.

Changes and modifications in the specifically described embodiments can be carried out by those skilled in the art without departing from the scope of the invention which is intended to be limited only by the scope of the appended claims.

What is claimed is:

1. A feed mechanism for use with a right angle drill having a cutting end and a gear housing end, comprising:
   (a) a housing, partially enclosing both said cutting end and said gear housing end of said right angle drill;
   (b) means, operably connected to said housing, for adjusting the thrust of a drill bit into a work piece; and
   (c) means, interdisposed between a first end of said housing and a workpiece, for holding said housing in a fixed position during operation of said right angle drill said holding means having an aperture defined therein, said holding means designed for both mating with said housing and accepting a drill bit.

2. The feed mechanism as recited in claim 1, wherein said housing comprises a means for attaching said first end of said housing to said holding means.

3. The feed mechanism as recited in claim 2, wherein said holding means is a drill guide bushing integrally attached to said first end of said housing, said drill guide bushing having a groove about its circumference.

4. The feed mechanism as recited in claim 1, said housing having an aperture at a second end of said housing.

5. The feed mechanism as recited in claim 4, wherein said adjusting means comprises:
   (a) a threaded member, wherein a first end of said threaded member is fixedly attached to said gear housing end, and wherein a second end of said threaded member extends through said aperture of said second end of said housing; and
   (b) means, located at the outer surface of said second end of said housing, for receiving said threaded member.

6. The feed mechanism as recited in claim 5, wherein said threaded member is fixedly attached to said gear housing end with an adhesive.

7. The feed mechanism as recited in claim 5, wherein said receiving means is a knurled screw support.

8. The feed mechanism as recited in claim 5, wherein said adjusting means further comprises a means, located at the inner surface of said second end of said housing, for securing said receiving means.

9. The feed mechanism as recited in claim 8, wherein said securing means is a snap ring.

10. The feed mechanism as recited in claim 2, wherein said holding means comprises a means for locking said attaching means to said holding means.

11. The feed mechanism as recited in claim 10, said locking means having a first groove, and said locking means further comprising:
   (a) a pin, capable of travel within said first groove from a first position to a secured second position; and
   (b) means for retaining said pin in said secured second position.

12. The feed mechanism as recited in claim 11, wherein said retaining means is a second groove.

13. The feed mechanism as recited in claim 2, wherein said holding means is a drill plate.

14. A feed mechanism for use with a right angle drill having a cutting end and a gear housing end, comprising:
   (a) a housing partially enclosing both said cutting end and said gear housing end of said right angle drill;
   (b) a drill guide bushing, having a groove about its circumference, integrally attached to a first end of said housing;
   (c) a threaded member, wherein a first end of said threaded member is fixedly attached to said gear housing end with an adhesive and wherein a second end of said threaded member extends through an aperture in a second end of said housing;
   (d) a knurled screw support, located at the outer surface of said second end of said housing, for receiving said threaded member;
   (e) a snap ring, located at the inner surface of said second end of said housing, for securing said knurled screw support;
   (f) a drill plate having an aperture which is used for attaching said drill guide bushing within said drill plate; and
   (g) a pin, slidably disposed within said drill plate, for locking said drill guide bushing into said drill plate.

* * * * *